US012579667B2

(12) United States Patent  
Goussies et al.

(10) Patent No.: US 12,579,667 B2  
(45) Date of Patent: Mar. 17, 2026

(54) SYSTEM AND/OR METHOD FOR CONVEYOR MOTION ESTIMATION

(71) Applicant: Chef Robotics, Inc., San Francisco, CA (US)

(72) Inventors: Norberto A. Goussies, San Francisco, CA (US); Clement Creusot, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 371 days.

(21) Appl. No.: 18/499,092

(22) Filed: Oct. 31, 2023

(65) Prior Publication Data

US 2024/0144494 A1 May 2, 2024

Related U.S. Application Data

(60) Provisional application No. 63/421,081, filed on Oct. 31, 2022.

(51) Int. Cl.  
$\begin{array}{lll} \textbf{\textit{G06T 7/292}} & (2017.01) \\ \textbf{\textit{B25J 9/16}} & (2006.01) \\ & \text{(Continued)} \end{array}$

(52) U.S. Cl.  
CPC ............. G06T 7/292 (2017.01); B25J 9/1697 (2013.01); B65G 43/00 (2013.01); G06T 7/248 (2017.01);  
(Continued)

(58) Field of Classification Search  
CPC .... B25J 9/1697; B25J 11/0045; B25J 9/0093; B25J 15/0052; B25J 15/04; B25J 9/1664;  
(Continued)

(56) References Cited

U.S. PATENT DOCUMENTS

| | | | | |
|---|---|---|---|---|
| 8,577,158 B2 * | 11/2013 | Yin | ...................... | H04N 19/593 |
| | | | | 382/243 |
| 9,307,221 B1 * | 4/2016 | Tang | .................... | H04N 23/689 |

(Continued)

FOREIGN PATENT DOCUMENTS

| | | | | |
|---|---|---|---|---|
| CN | 113283344 B | * | 3/2024 | ............. G06V 20/42 |
| KR | 101426417 B1 | * | 8/2014 | ............. G06T 7/248 |

OTHER PUBLICATIONS

Unkovic, et al., "Robotic End Effector System for Multiple Deposits", U.S. Appl. No. 19/186,481, filed Apr. 22, 2025.

*Primary Examiner* — Babar Sarwar  
(74) *Attorney, Agent, or Firm* — Jeffrey Schox; Evan Myers

(57) ABSTRACT

The method can include: sampling images of a conveyor region S110; determining a set of patches S120; estimating a displacement for each patch S130; estimating a conveyor motion parameter(s) based on the patch displacement S140; and optionally performing an action based on the conveyor motion parameter S150. However, the method S100 can additionally or alternatively include any other suitable elements. The method S100 functions to estimate a set of conveyor motion parameters (e.g., conveyor speed). Additionally or alternatively, the method can function to enable dynamic control of an independent robotic assembly system(s) to accommodate conveyor motion changes.

20 Claims, 7 Drawing Sheets  
(2 of 7 Drawing Sheet(s) Filed in Color)

(51) Int. Cl.

| | |
|---|---|
| *B65G 43/00* | (2006.01) |
| *G06T 7/246* | (2017.01) |
| *G06T 7/50* | (2017.01) |
| *G06T 7/70* | (2017.01) |

(52) U.S. Cl.
CPC ................. *G06T 7/50* (2017.01); *G06T 7/70* (2017.01); *G06T 2207/10028* (2013.01); *G06T 2207/20021* (2013.01); *G06T 2207/30108* (2013.01)

(58) Field of Classification Search
CPC ........ B25J 9/1682; B25J 13/08; B25J 9/1679; B25J 9/1687; B65B 35/16; B65B 35/24; B65B 57/14; G05B 19/4182; G05B 2219/39102; G05B 2219/40607; B65G 2201/0202; B65G 47/905; B65G 47/907; B65G 43/00; G06T 7/70; G06T 2207/10028; G06T 2207/20021; G06T 2207/20084; G06T 2207/30108; G06T 2207/30128; G06T 2207/30241; G06T 7/20; G06T 7/246; G06T 7/248; G06T 7/292; G06T 7/50; G06V 10/764; G06V 20/68
See application file for complete search history.

(56) References Cited

U.S. PATENT DOCUMENTS

| | | | | |
|---|---|---|---|---|
| 9,730,643 | B2 * | 8/2017 | Georgescu | A61B 5/7267 |
| 10,032,286 | B2 * | 7/2018 | Feldman | G06T 7/248 |
| 2011/0166703 | A1 * | 7/2011 | Byrne | B25J 9/1682 |
| | | | | 901/50 |
| 2013/0020175 | A1 * | 1/2013 | McKeen | G01N 1/31 |
| | | | | 198/346.1 |
| 2015/0063709 | A1 * | 3/2015 | Wang | G06T 7/12 |
| | | | | 382/199 |
| 2015/0238148 | A1 * | 8/2015 | Georgescu | G06V 10/772 |
| | | | | 600/408 |
| 2016/0140700 | A1 * | 5/2016 | Park | G06T 5/77 |
| | | | | 382/275 |
| 2017/0249776 | A1 * | 8/2017 | Cao | G06T 17/005 |
| 2017/0290345 | A1 * | 10/2017 | Garden | A21C 9/08 |
| 2018/0174326 | A1 * | 6/2018 | Katchalov | G06T 7/37 |
| 2019/0291277 | A1 * | 9/2019 | Oleynik | B25J 9/1669 |
| 2020/0054175 | A1 * | 2/2020 | Roy | B25J 21/00 |
| 2020/0082522 | A1 * | 3/2020 | Bonneau | G06V 10/82 |
| 2020/0090099 | A1 * | 3/2020 | Johnson | B25J 9/1664 |
| 2020/0394603 | A1 * | 12/2020 | Ottitsch | G06Q 30/0185 |
| 2022/0048707 | A1 * | 2/2022 | Matl | B65G 47/915 |
| 2022/0348409 | A1 * | 11/2022 | Sun | B65G 1/1378 |
| 2023/0039524 | A1 * | 2/2023 | Bhageria | B25J 9/0093 |
| 2023/0191615 | A1 | 6/2023 | Creusot et al. | |

* cited by examiner

S100

| S110 |
| --- |
| Sampling images of a conveyor region |

↓

| S120 |
| --- |
| Determining a set of patches |

↓

| S130 |
| --- |
| Estimating a displacement for each patch |

↓

| S140 |
| --- |
| Estimating a conveyor motion parameter(s) based on the patch displacement |

↓

| S150 |
| --- |
| Performing an action based on the conveyor motion parameter |

S100

Image frame lower-confidence patch (higher-confidence) dynamic patch static patch

S100

Image frame occlusion lower-confidence image patch higher-confidence image patch static image patch

S100

SYSTEM AND/OR METHOD FOR CONVEYOR MOTION ESTIMATION

CROSS REFERENCE TO RELATED APPLICATIONS

This application claims the benefit of U.S. Provisional Application No. 63/421,081, filed 31 Oct. 2022, which is incorporated herein in its entirety by this reference.

This application is related to U.S. application Ser. No. 17/881,475, titled "SYSTEM AND/OR METHOD FOR ROBOTIC FOODSTUFF ASSEMBLY," filed 4 Aug. 2022, and U.S. application Ser. No. 18/075,961, filed 6 Dec. 2022, titled "SYSTEM AND/OR METHOD OF COOPERATIVE DYNAMIC INSERTION SCHEDULING OF INDEPENDENT AGENTS," each of which is incorporated herein in its entirety by this reference.

TECHNICAL FIELD

This invention relates generally to the foodstuff assembly field, and more specifically to a new and useful conveyor motion estimation system and/or method in the robotic assembly field.

BRIEF DESCRIPTION OF THE FIGURES

The patent or application file contains at least one drawing executed in color. Copies of this patent or patent application publication with color drawing(s) will be provided by the Office upon request and payment of the necessary fee.

BACKGROUND

Existing object tracking and optical flow techniques for speed estimation may depend on scene heterogeneity to observe relative motion within a scene. Such methods may not be well suited to estimating conveyor motion, which may be homogenous (e.g., along an unadorned conveyor belt) and regularly occluded, and for which relative motion may only occur for part of an image scene (e.g., conveyor region). Thus, there is a need in the robotic assembly field for a new and useful system and/or method for conveyor motion estimation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
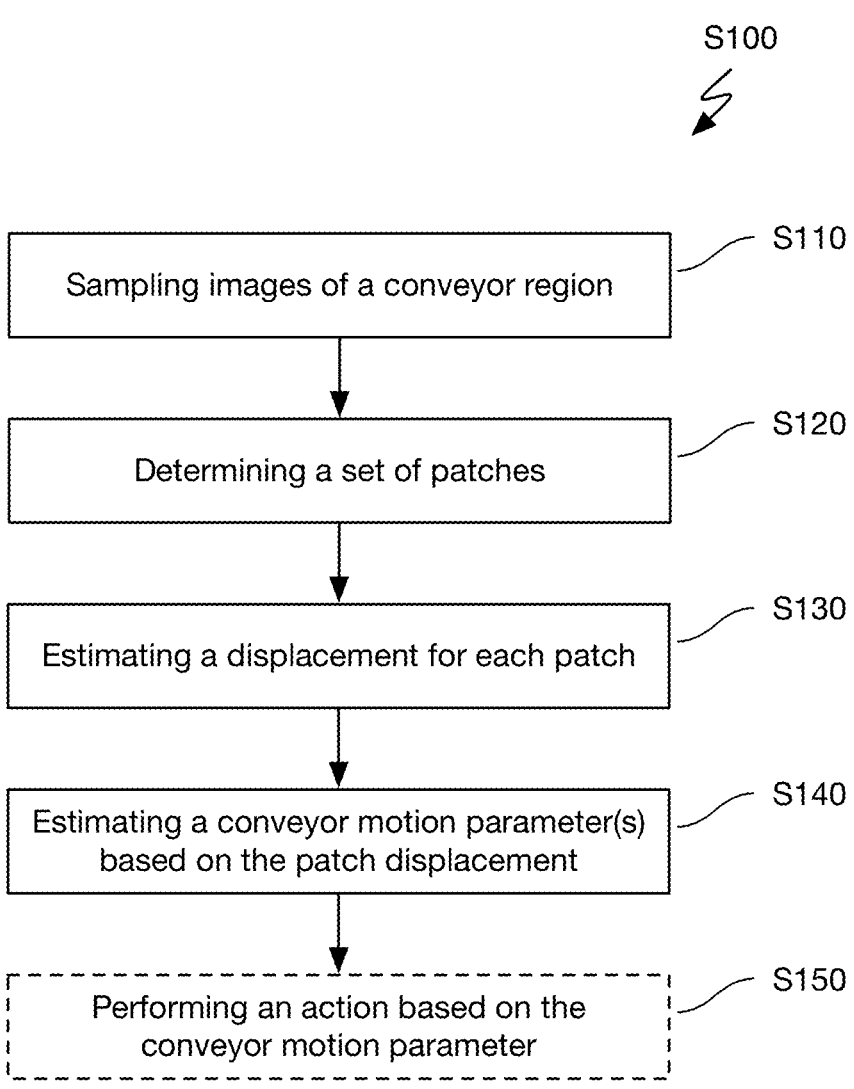
FIG. 1 is a flowchart diagrammatic representation of a variant of the method.

The method S100, an example of which is shown in FIG. 1, can include: sampling images of a conveyor region S110; determining a set of patches S120; estimating a displacement for each patch S130; estimating a conveyor motion parameter(s) based on the patch displacement S140; and optionally performing an action based on the conveyor motion parameter S150. However, the method S100 can additionally or alternatively include any other suitable elements. The method S100 functions to estimate a set of conveyor motion parameters (e.g., conveyor speed). Additionally or alternatively, the method can function to enable dynamic control of an independent robotic assembly system(s) to accommodate conveyor motion changes (e.g., without communicating with a conveyor line controller; without an integrated conveyor line sensor; utilizing a sensor suite of the robot; etc.).

In some variants, method S100 can be used with a robotic assembly system 100, such as a robotic pick and place system, gantry-style dispensing system, multi-axis robotic arm, and/or other robotic assembly system. In one variant, the method can be used in conjunction with the robotic foodstuff assembly system and/or methods as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

Figure 6:
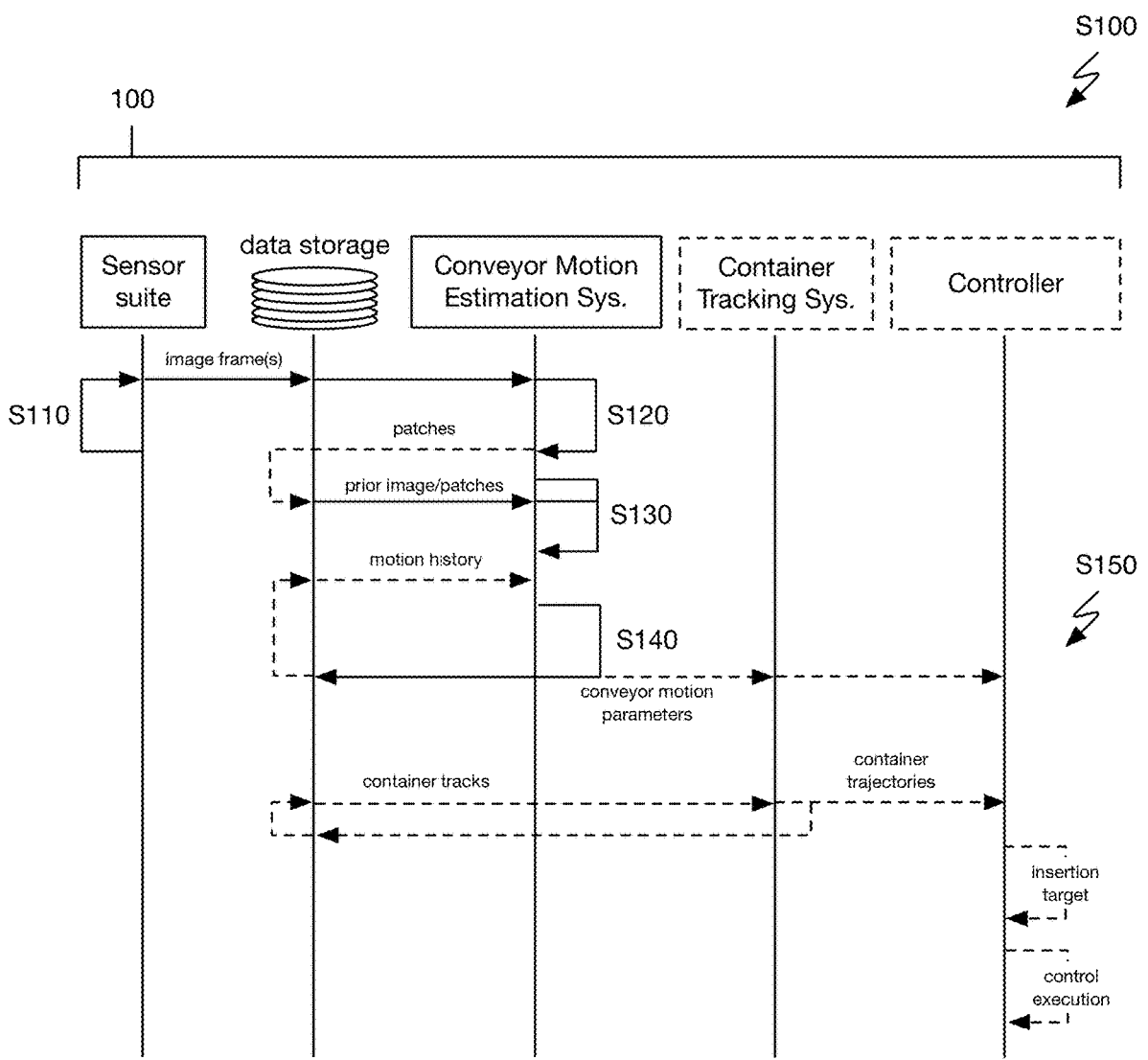
FIG. 6 is a flowchart diagrammatic representation of a variant of the system and/or method.
Figure 9:
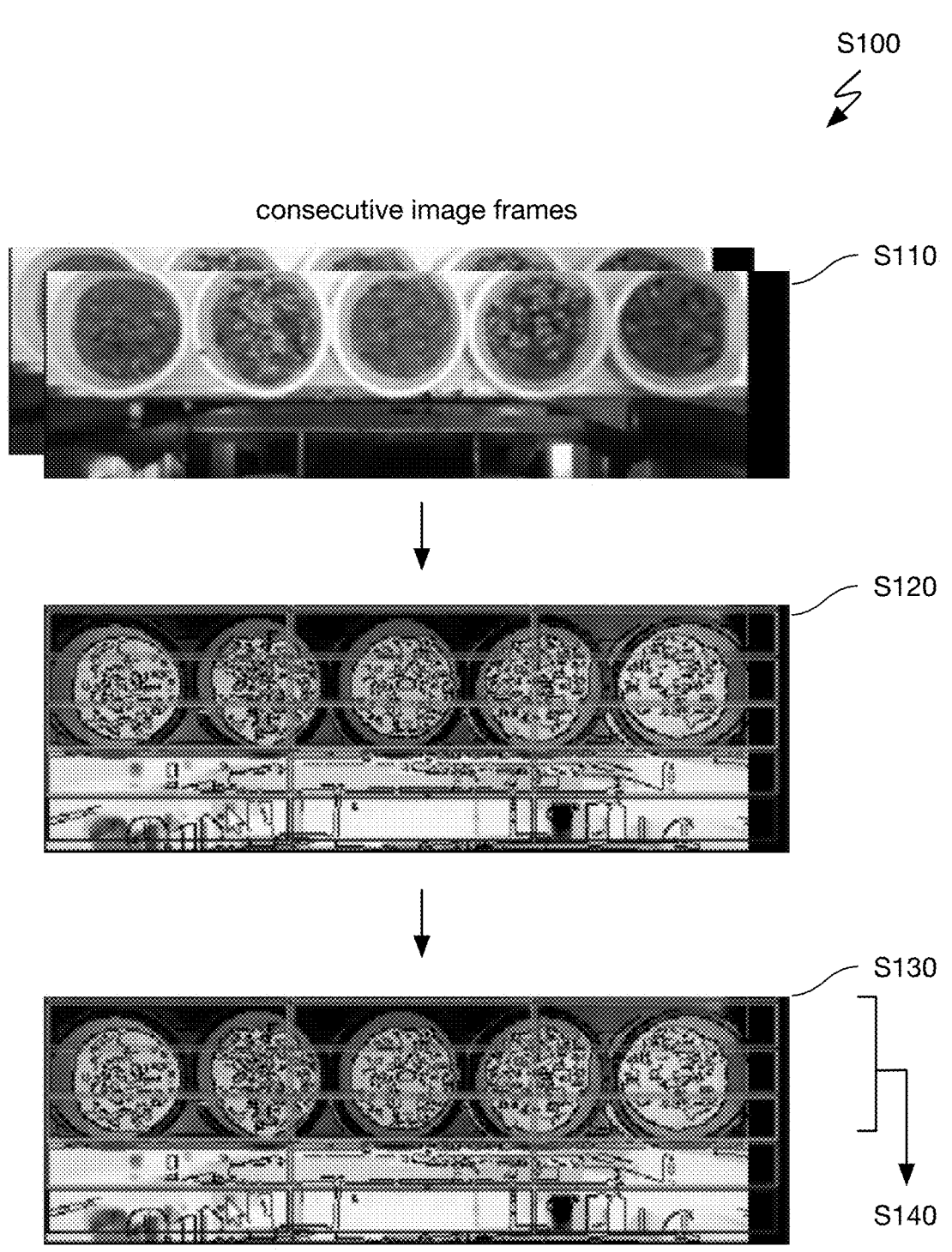
FIG. 9 is a flowchart diagrammatic representation of a variant of the method.

The method S100 can optionally include or be used in conjunction with an industrial conveyor line 102 or deployed in a high-throughput assembly application (e.g., airline food catering prep, etc.; continuously moving line; where a container throughput rate exceeds an insertion throughput rate of a robotic assembly module by a factor of: 1.5, 2, 3, 4, greater than 4, any range bounded by the aforementioned values, and/or any other suitable line speed, etc.), such as in place of a human line worker. In a specific example, cyclic operation (e.g., ingredient insertion) by a robotic system and/or the method can define an operational rate, wherein a container throughput rate of the conveyor line is greater than the operation rate (e.g., between 100% and 200% of an insertion rate, exactly 200% of the insertion rate, greater than 200% of the insertion rate, etc.). Additionally or alternatively, variants of the system and/or method can be implemented in a restaurant setting, such as a 'fast casual', 'ghost kitchen' or low-throughput application (e.g., without continuous operation; universities, K-12 schools, prisons, hotels, hospitals, factories, stadiums, entertainment venues, festivals, etc.). However, the system can alternatively be deployed in any suitable robotic assembly setting(s). In one set of variants, an example of which is shown in FIG. 6, the method can be used with a system 100 which includes a sensor suite, data storage, a conveyor motion estimation system, an optional container tracking system, and an optional controller. An example illustration of S100 is illustrated in FIG. 9.

The term "task space" as utilized herein preferably refers to a mathematical set of effector and/or food utensil poses (e.g., available in a particular arrangement), but can be otherwise suitably used or referenced. The term "workspace" preferably refers to a physical volume associated with all reachable/available poses (e.g., points) for the system and/or robot arm thereof. For example, the workspace of a robot arm can be defined entirely based on the geometry of joints and/or intrinsic kinematic constraints of the arm (e.g., a manufacturer specification, etc.). Similarly, the workspace of a foodstuff assembly system which includes a robot arm can be further restricted by constraints imposed by other system components (e.g., frame geometry, joint boundaries imposed by control software, collision constraints, etc.). Accordingly, the restricted workspace of the foodstuff assembly system can refer to the physical volume in which the robot operates based on the (effective) task space of the robot in a particular configuration.

The term "conveyor region" as utilized herein preferably refers to the portion of a conveyor line within the workspace of a robot (e.g., for the registered pose of the robot and/or sensor coordinate frame of the robot; intersection of robot workspace and movable portion of conveyor, which may be estimated as a single plane). The conveyor region can be defined in and/or referenced relative to any one or more of: an image pixel space (e.g., for camera images collected by the robot) and/or a sensor coordinate frame, a robot coordinate frame (e.g., relative to the workspace and/or task space), and/or global/external coordinate frame(s).

The term "substantially" as utilized herein can mean: exactly, approximately, within a predetermined threshold or tolerance, and/or have any other suitable meaning.

1.1 Illustrative Examples

Figure 7:
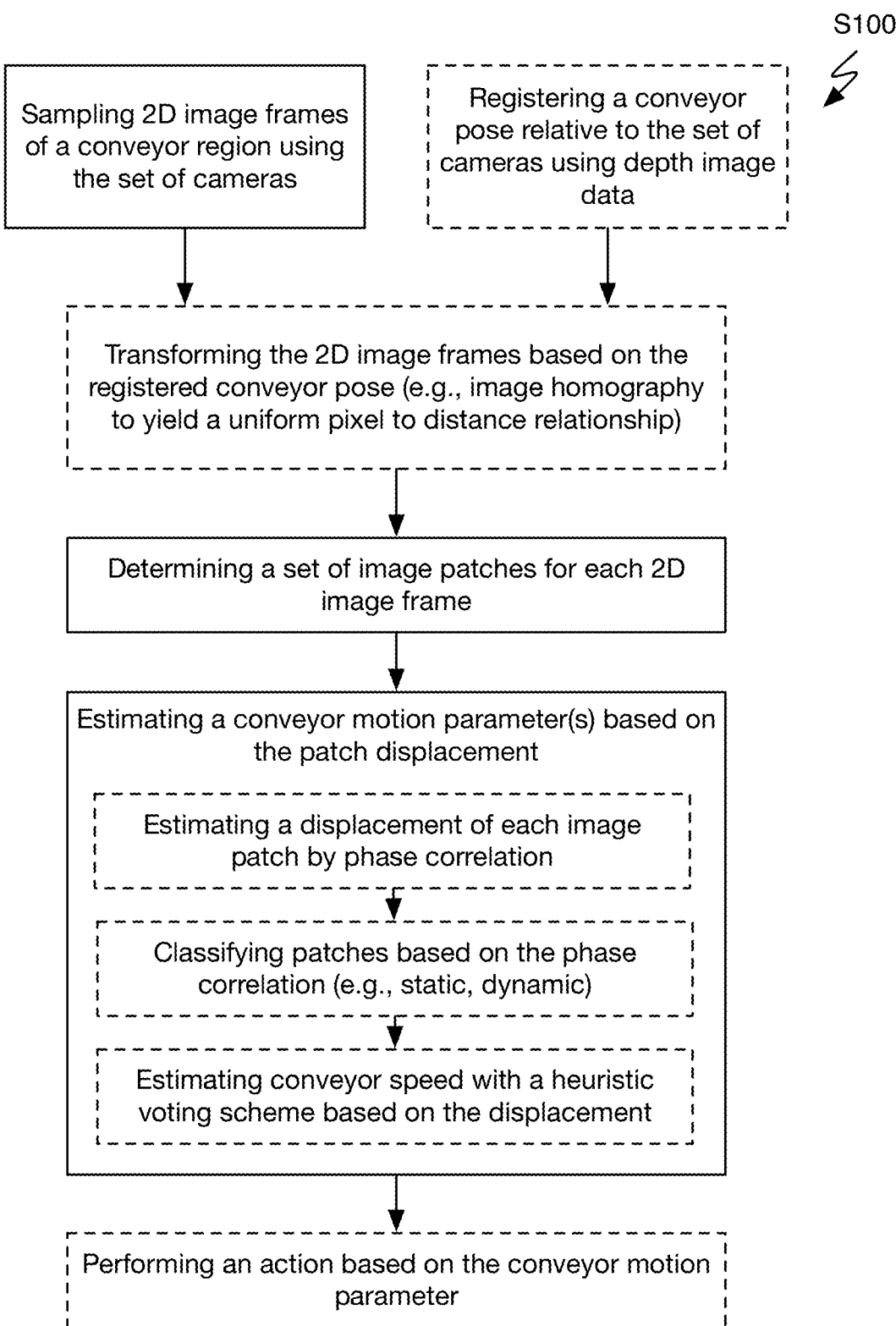
FIG. 7 is a flowchart diagrammatic representation of a variant of the method.

In a first set of variants (e.g., an example is shown in FIG. 7), a method of image-based estimation of conveyor motion for a robot operating along a conveyor line includes: at a first time, sampling a first image frame of a conveyor region with a set of cameras; at a second time, sampling a second image frame with the set of cameras; determining a plurality of image patches within the first image frame; estimating a respective displacement for each image patch between the first and second image frames; classifying a first subset of the plurality of image patches as dynamic image patches based on the respective displacement; estimating a conveyor motion parameter for the conveyor line based on the respective displacement of each dynamic image patch of the first subset; and dynamically controlling the robot based on the conveyor motion parameter.

Figure 8:
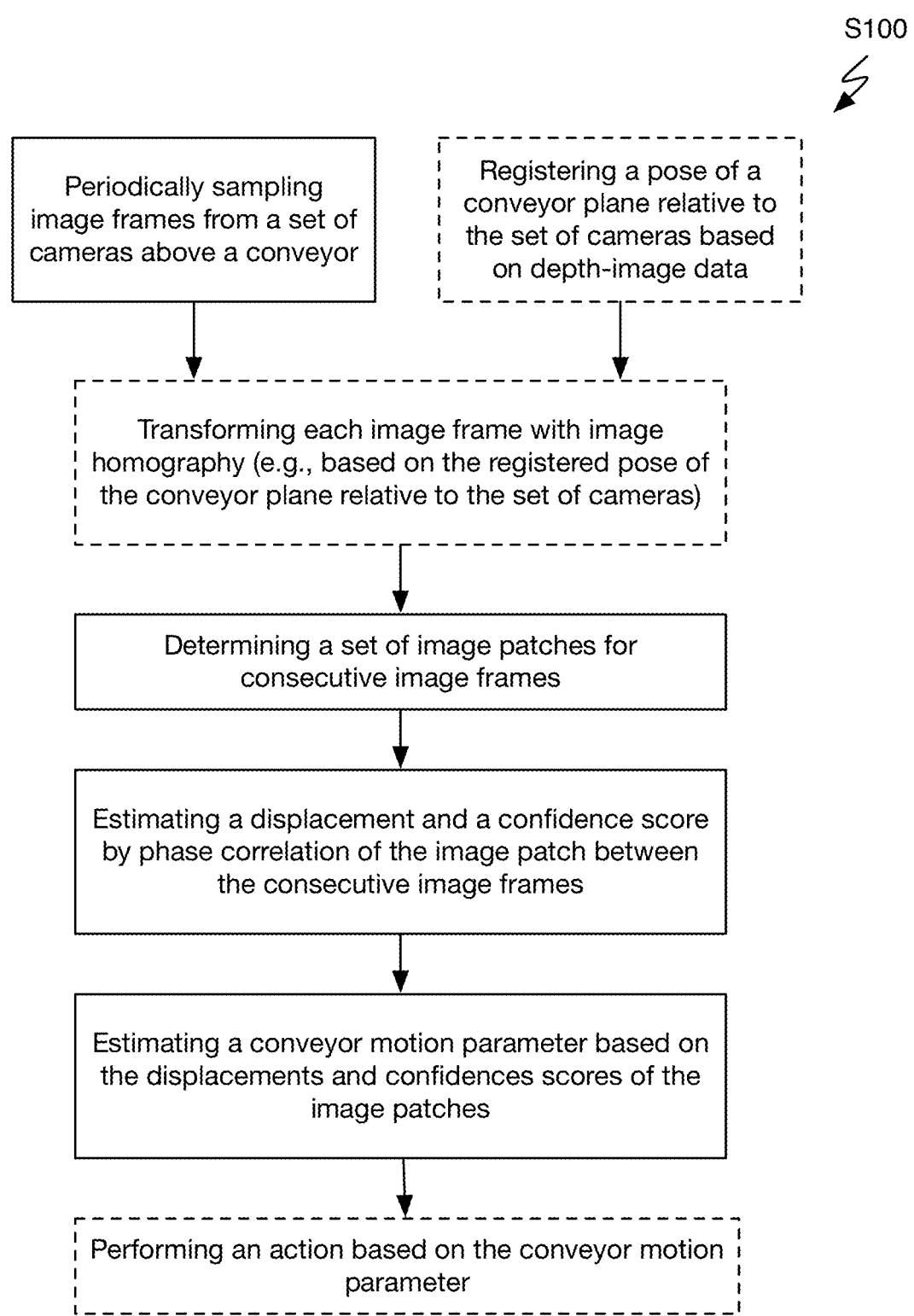
FIG. 8 is a flowchart diagrammatic representation of a variant of the method.

In a second set of variants (e.g., an example is shown in FIG. 8), nonexclusive with the first, a method of image-based estimation of conveyor motion for a robot operating along a conveyor line, includes: periodically sampling image frames from a set of cameras above a conveyor line; for each pair of consecutive image frames of the conveyor line: determining a plurality of image patches; for each image patch, estimating a displacement and a confidence score by phase correlation of the image patch between the consecutive image frames; and estimating a conveyor motion parameter based on the displacements and confidences scores of the image patches; and dynamically controlling the robot based on the conveyor motion parameter estimated for each pair of consecutive image frames. In one variant, the method can further include: registering a pose of a conveyor plane relative to the set of cameras based on depth-image data; based on the registered pose of the conveyor plane relative to the set of cameras, transforming each image frame with image homography, wherein the image frames are 2D image frames, wherein the conveyor motion parameter is estimated based on a first assumption of uniform motion of the conveyor and a second assumption of conveyor planarity. In one variant, the method can further include: for at least one pair of consecutive image frames of the conveyor line: filtering out a first subset of low-confidence image patches of the plurality of image patches based on the confidence score falling below a confidence threshold; filtering out a second subset of static image patches of the plurality of image patches based on the displacement falling below a threshold displacement; and after filtering out the first and second subsets of image patches, estimating the conveyor motion parameter based on a remainder of the plurality of image patches.

2. Benefits

Variations of the technology can afford several benefits and/or advantages.

First, variations of this technology can enable the use of robotic (foodstuff) assembly modules which may be electrically and/or communicatively decoupled from (e.g., not in communication with) a conveyor line controller by estimating the motion of the conveyor (e.g., in substantially real time, such as with a frequency of 3-5 Hz). Such variants can improve the reconfigurability, serviceability, and/or scalability of modules along a conveyor line and/or may decrease the burden of integrating such systems.

Figure 2:
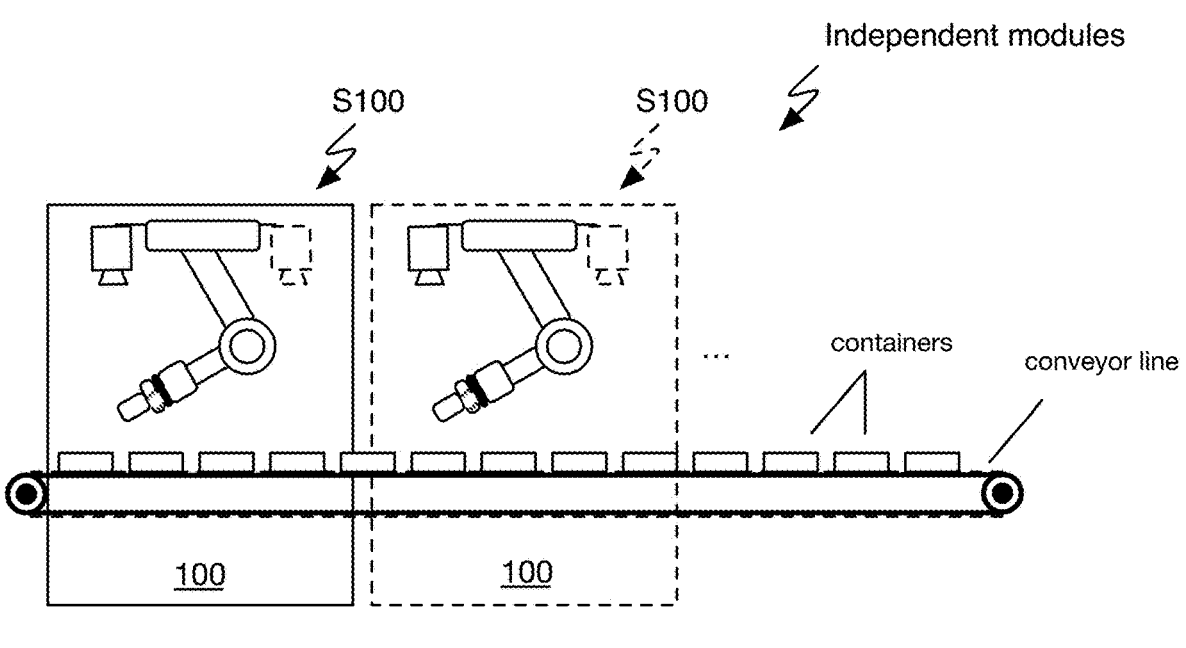
FIG. 2 is a schematic representation of a variant of the system and/or method.

Second, variations of this technology can provide dynamic estimation of conveyor motion which can be used for dynamic insertion planning/scheduling for robotic assembly modules (e.g., operating independently without a central planning/control node to coordinate between modules and/or communicate with a conveyor line controller/sensor). Such variants can be more robust to changes in line speed and flexible labor constraints—such as dynamic changes in the conveyor line speed (e.g., which may occur inherently for some conveyors based on the mass of transported objects/containers) and/or changes in the number and arrangement of robotic assembly systems (e.g., independently operating without a central controller; an example is shown in FIG. 2).

Figures 4, 5:
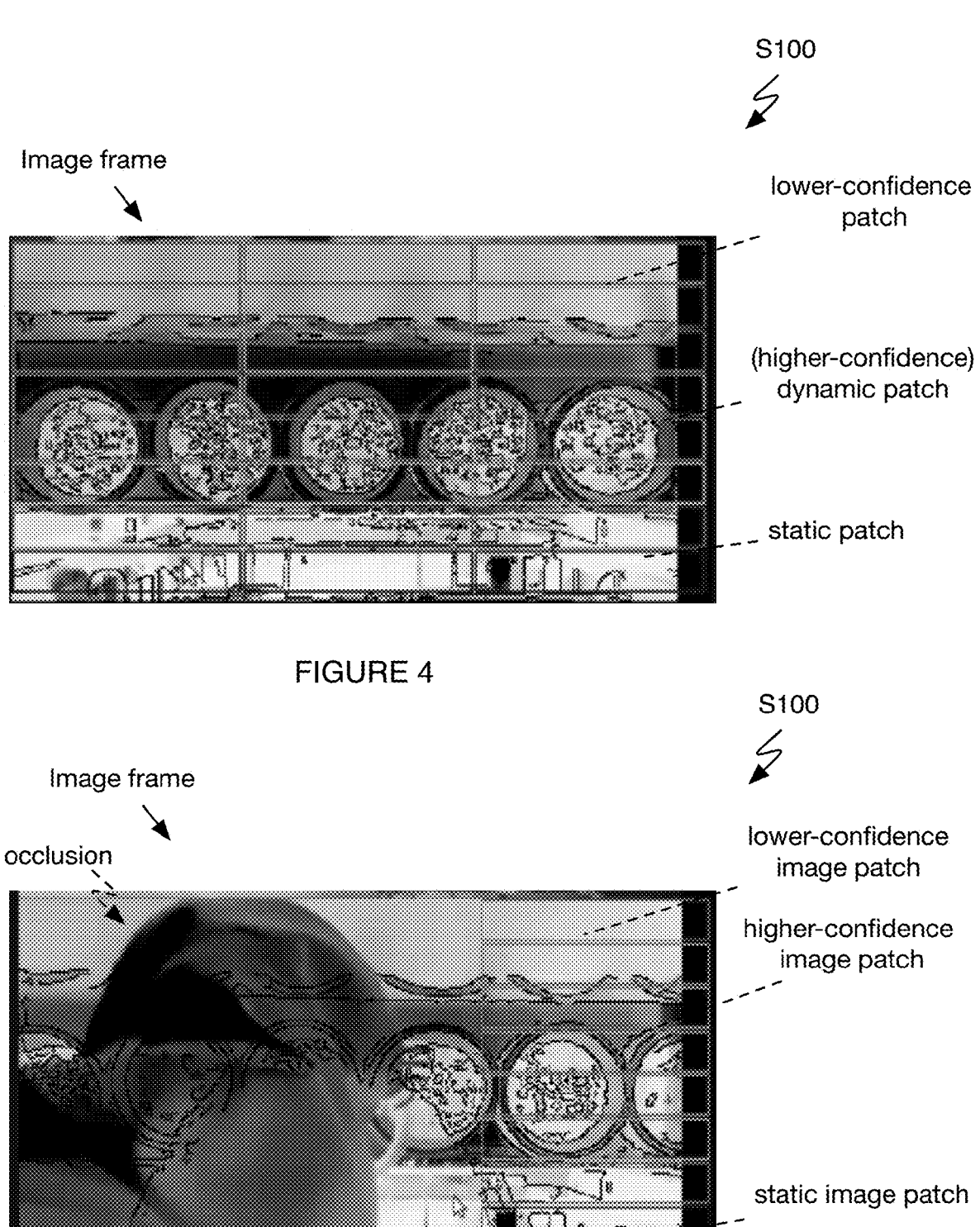
FIG. 4 is an example image frame for a variant of the method illustrating images patches with classifications.
FIG. 5 is an example image frame for a variant of the method illustrating images patches with classifications for a partially occluded image frame.

Third, variations of this technology can provide a persistent, continuous estimates of conveyor line speed and/or pose estimation of containers on the conveyor line, which can enable substantially continuous operation of the robot arm (e.g., without pauses for sensing when the robot arm obstructs various perception sensors) and/or control/trajectory planning when the container is occluded (e.g., by a robotic arm). For example, a current pose of a container and/or a current conveyor speed/direction can be estimated while the container and conveyor line are partially or fully occluded, such as by a robot arm placing into the container (e.g., an example is shown in FIG. 5). Accordingly, variants of the technology can allow for planning and control updates concurrently with a robot arm occluding the field of view of the perception sensor(s) (e.g., which may be necessary for accurate placement, since a robot arm may regularly occlude perception of a container while placing into said container for some configurations of the system). Additionally, such variants can enable automatic perception and control adjustment to variable conveyor speed (and throughput), which can allow the system to automatically accommodate and adjust for increases in line speed (e.g., as operations scale for a particular line). Additionally or alternatively, variants can allow automatic control responses to line stoppages. For example, if a conveyor stops (e.g., due to a downstream issue) the robot can respond by automatically adjusting control to avoid operational errors such as ingredient spillage and/or insertion into the wrong compartment of a container).

Fourth, variations of this technology can facilitate image-based speed estimation and/or object tracking in a high-throughput conveyor line setting. Variants of the technology can utilize robust perception techniques to estimate conveyor motion parameters while accommodate variability in environmental/external factors such as: lighting conditions, conveyor appearance (e.g., color, texture, etc.), conveyor dimensions (e.g., width), number of lanes, conveyor type (e.g., piecewise indexing, continuous, etc.), conveyor height, conveyor pose (e.g., slope, pitch/yaw angles, etc.), conveyor velocity (e.g., conveyors may slowly ramp up and down speed when starting and stopping), and/or other sources of environmental variability. Additionally, variants can reduce noise in conveyor speed estimation (e.g., reduce/ mitigate noise associated with sensor vibration; where sensor vibrations or frame perturbations may occur on the order of 10+Hz; where dynamic conveyor speed changes may occur on the order of 1-5 Hz).

However, variations of the technology can additionally or alternately provide any other suitable benefits and/or advantages.

3. Method

The method S100, an example of which is shown in FIG. 1, can include: sampling images of a conveyor region S110; determining a set of patches S120; estimating a displacement for each patch S130; estimating a conveyor motion parameter(s) based on the patch displacement S140; and optionally performing an action based on the conveyor motion parameter S150. However, the method S100 can additionally or alternatively include any other suitable elements. The method S100 functions to estimate a set of conveyor motion parameters (e.g., conveyor speed). Additionally or alternatively, the method can function to enable dynamic control of an independent robotic assembly system(s) to accommodate conveyor motion changes (e.g., without communicating with a conveyor line controller; without an integrated conveyor line sensor; utilizing a sensor suite of the robot; etc.).

Method S100 and/or a portion thereof can be performed once, repeatedly, periodically (e.g., less than 1 Hz, 1 Hz, 2 Hz, 3 Hz, 5 Hz, 6 Hz, 7 Hz, greater than 7 Hz, any open or closed range bounded by the aforementioned values, and/or with any other suitable frequency/periodicity), in response to satisfaction of a trigger event (e.g., API call, pull request by a user, etc.), and/or with any other suitable frequency/ timing. The method S100 is preferably executed contemporaneously and/or simultaneously with operation of a conveyor line to facilitate robotic operation along the assembly line, but can be otherwise executed. For instance, the method can be repeatedly executed by a computing system/controller of a modular robotic assembly system (e.g., configured to operate in place of a human along a high-throughput assembly line) to facilitate insertion planning and/or trajectory estimation. In one variant, the method can be used in conjunction with the robotic foodstuff assembly system and/or methods as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

Sampling images of a conveyor region S110 functions to sample images of the conveyor which can be used for conveyor motion estimation. Additionally, the images can be used to facilitate container tracking within the container region and/or insertion planning/control for a robot operating along the conveyor line (e.g., to insert foodstuff into containers within the conveyor region).

Images are preferably sampled periodically in accordance with a predetermined frame rate (e.g., less than 3 FPS, 3 FPS, 5 FPS, 10 FPS, 20 FPS, 30 FPS, greater than 30 FPS, any open or closed range bounded by the aforementioned values, etc.), but can alternatively be sampled/received with any other suitable timing/frequency. For example, images may be collected at a standard frame rate (e.g., 30 FPS) and down-sampled to increase observability of conveyor displacements within the images (e.g., down-sampled to 3-5

FPS, down-sampled to 2-6 FPS, etc.; which may reduce/ mitigate noise associated with sensor vibration; where sensor vibrations or frame perturbations may occur on the order of 10+Hz; where dynamic conveyor speed changes may occur on the order of 1-5 Hz). As an example, object tracking within the conveyor region may utilize higher frequency perception data and/or larger volumes of perception data (e.g., RGB data; depth data; 30+ FPS images) to facilitate accurate real-time object detection/tracking, whereas conveyor motion estimation by S100 may utilize on a smaller dataset (e.g., 2D grayscale images; 3-5 FPS) and/or a subset of sampled perception data.

The images sampled in S110 include or span a conveyor region (e.g., with a field of view of the sensor(s) used to collect the images directed towards the conveyor and/or a region thereof). For example, a conveyor region can be within a workspace of a robotic assembly module and/or a robot arm thereof, wherein the robotic assembly module is configured to insert ingredients into containers occupying the conveyor region of the conveyor line. As a second example, the conveyor region can be a region/portion of a conveyor line which is observable within the images collected during S110. As a third example, portions of images (e.g., patches) which contain the conveyor region can be used for conveyor motion estimation in subsequent portions of the method.

Imaging data is preferably sampled with sensors of a sensor suite of a robotic assembly module (e.g., an imaging system; RGB camera; depth image sensor; etc.), but can alternatively be received from a set of remote/external sensors and/or any suitable set of endpoint(s). Imaging data can include: an RGB image, a grayscale image, a depth image, a 3D image, a point cloud, and/or any other suitable imaging data. As an example, images sampled in S110 can include 2D image frames (e.g., sampled as a series of RGB image frames or grayscale image frames) and depth information (e.g., RGB-depth [RGB-d] image frames; sampled by a depth image sensor; extracted from a point cloud generated by time-of-flight sensing; etc.). Imaging data can optionally be pre-processed based on a sensor calibration (e.g., bundle adjusted based on sensor pose, cropped to remove image regions beyond the conveyor region and/or a robot workspace, etc.), converted into standardized coordinate frame (e.g., conveyor workspace of a robotic assembly module, etc.), and/or can be otherwise suitably pre-formatted or, alternatively, not be pre-formatted.

In one set of variants, images are preferably pre-processed and/or transformed to yield a uniform pixel-to-distance relationship during S110, such that the dimension(s) of each pixel uniformly and repeatably map to a static physical space/offset (e.g., on a conveyor plane/surface). For example, image homography may be used to convert the image(s) sampled in S110 to a uniform pixel space, in which each pixel offset corresponds to the same static space offset and/or physical distance in the scene, such as along a length of the conveyor in a conveyor plane. The uniform pixel space (e.g., pixel mapping space) can be determined based on conveyor registration, 3D conveyor mapping, and/or otherwise determined. In a first variant, the sampled images can be transformed based on a predetermined conveyor pose and/or conveyor registration (e.g., a conveyor plane in an established coordinate frame). For example, a static/fixed transformation can be applied to each sampled image based on the (registered) pose of the sensor relative to the conveyor. In a second variant, the sampled images can be transformed based on 3D detections for a current frame. However, sampled images can be pre-processed with any other suitable image transformations to achieve a uniform pixel-to-distance relationship within the image frame, such as based on a lens correction, sensor calibration, sensor/conveyor pose estimation, frame/pixel depth estimation, and/or any other suitable information.

The images sampled in S110 are preferably timestamped and/or time-correlated, which may allow for conveyor speed estimation and/or object (container) tracking as a function of time. However, images can be otherwise collected and/or can include or be associated with any other suitable data.

S110 can be performed in-situ with a robotic foodstuff assembly module (e.g., registered pose/arrangement relative to a conveyor line and/or in a particular configuration). Additionally, sensor data collected in S110 can include any other suitable sensor data from a robot assembly module sensor suite. Additionally or alternatively, S110 can be performed by a separate/external system and/or using any other suitable imaging sensors/systems.

Sensor data can be collected by a single camera (e.g., conveyor imaging camera; centered above a conveyor region of a robotic assembly module) and/or multiple cameras (e.g., a pair of cameras at either end of the conveyor region of a robotic assembly module; offset along a direction of conveyor motion; on either side of a base of the robot arm relative to a direction of motion of the conveyor), which may facilitate imaging with fewer occlusions by the robot arm (e.g., where some portions of the conveyor may be occluded in an image from a first camera and but observed by a second camera). As an example, a plurality of cameras can be synchronized to capture multiple images for each frame (e.g., thereby increasing the available image data volume and/or reduce occlusions to improve speed estimation across frames)

However, sensor data can be otherwise sampled/determined, and/or any other suitable sensor data can be used to facilitate other portions of the method.

Determining a set of patches S120 functions to subdivide the image into subregions which can be separately evaluated for displacement and/or conveyor motion estimation. Additionally or alternatively, S120 can function to filter out image regions (e.g., patches) which may contain extraneous, noisy, or difficult-to-analyze image data, (e.g., such as image data of a static environment/scene; image regions containing occlusions; etc.). The patches are preferably sub-regions of the image frame (e.g., 2D grayscale image sub-regions; pixel bins), but can additionally include depth-image data, RGB data, edge/feature detections based on the image data, and/or any other suitable data/information. As an example, each patch can contain the (grayscale) image data within a pixel coordinate region of the image frame (e.g., intrinsically referenced relative to a static/invariant region of the ego coordinate frame; pixel coordinates [x1,y1] to [x2,y2]; patch coordinates can be the same or different iterations of S120; etc.), but can alternatively be any suitable sub-region of the image frame (e.g., defined by any suitable set of pixel coordinates).

In a first variant, the patches can be determined by subdividing the image according to a predetermined pattern, such as a grid/array (e.g., rectilinear grid, etc.). For example, the image can be subdivided into an M×N rectilinear grid, with M rows (e.g., 3, 5, 7, 9, 15 greater than 15, etc.) and N columns (e.g., 2, 3, 4, 5, greater than 5, etc.). In a first example, the predetermined grid array can be aligned with a primary axis associated with a (prior) conveyor registration. In a second example, the predetermined grid array can be based on an intrinsic coordinate frame of the system (e.g., relative to camera and/or machine coordinate frame, aligned with a lateral axis of the system, etc.). In a third example, each patch comprises a rectilinear grid cell having a long axis substantially parallel to an axis of conveyor motion. For instance, linear translation of a conveyor belt along a primary axis of the belt may be observed (ideally) as pixel transformations which occur parallel to the primary axis. Accordingly, it may be advantageous for individual patches to contain more pixels/data along a dimension substantially parallel to the axis of conveyor motion, since larger displacements can be anticipated/expected in this dimension (e.g., relative to an orthogonal dimension). In a fourth example, patches defined along the direction of conveyor transformation may be sized based on the maximum (nominal) occlusion. For example, where a robot arm (e.g., or a sleeve surrounding the robot arm) occupies a characteristic length (e.g., number of pixels, dimension along the conveyor region, etc.) of dimension D when it maximally occludes the image frame, the image frame having a dimension C along the conveyor length, the long dimension P of the patch is preferably smaller than C-D (e.g., $P<C-D$; $2P<C-D$; etc.). More preferably, the patches are sizes so that at least one patch along the conveyor region is un-occluded during nominal operation of a robot arm (e.g., for all configurations of the robot arm, etc.). Alternatively, the patches can be otherwise sized. In a fifth example, the short dimension of the patches can be a predetermined fraction of a container width and/or conveyor width. For example, where the patches are about 25-30% of the conveyor width (in a dimension perpendicular to a direction of conveyor transformation), 2-3 patches may fully overlap the conveyor region. However, patches can be otherwise determined based on a pattern/arrangement.

In a second variant, the patches can be determined based on a registered configuration of the system relative to the conveyor. For example, where a pose of the system and/or image coordinate frame of the system is registered/calibrated relative to the conveyor (e.g., a registered conveyor), the patches can be dynamically adjusted based on the known pose parameters of the conveyor relative to the system. For example, a registered conveyor region within the image frame can be subdivided into 9 patches forming a 3×3 grid. Alternatively, patches can be determined entirely independently of the registered configuration and/or arrangement of the system relative to a conveyor, (e.g., which may improve reconfigurability and robustness; where the conveyor motion parameter estimation may be an element of registration in some variants of S100; etc.).

In a third variant, the patches can be dynamically determined based on conveyor motion parameters and/or container tracking (e.g., container pose) parameters. For example, the conveyor belts may have relatively few distinguishing characteristics along its length (e.g., color deviations, marks, texture, etc.; particularly when they are clean and unadorned). Accordingly, it may be beneficial for all patches to overlap areas associated with object/container detections along the conveyor line. For example, patches can be dynamically selected to overlap objects (e.g., containers) detected within the container region. Alternatively, patches can be determined entirely independently of any object detections, container tracking, and/or boundaries of a conveyor region.

In variants, a subset of patches can be determined from the set of patches for each image frame to be used for conveyor motion parameter estimation in S140. For example, patches can be neglected, partially/fully masked, and/or otherwise unused for conveyor motion parameter estimation based on a determination that the image frame is (at least partially) occluded. Patch occlusions are preferably determined using depth image data (e.g., based on a maximum height of the depth image data for the patch; based on a lack of depth image data for the patch; based on the height exceeding a predetermined height threshold for the conveyor, such as can be predetermined based on a conveyor pose registration, or relative to a predetermined conveyor plane, etc.), but can additionally be determined based on robot arm state estimation (e.g., robot arm pose), CV-based classification or segmentation techniques (e.g., classifying patches as occluded using a neural network based classifier, etc.), color based image segmentation (e.g., where RGB data is used to segment a robot arm in the foreground from the remainder of the image, and the image is subsequently handled in a grayscale format), displacement estimation in S140 (e.g., an estimated displacement vector is misaligned with a primary axis of the conveyor), a comparison accuracy parameter computed in S140 (e.g., comparison of the frame with a prior frame shifted/transformed by the estimated displacement), and/or any other suitable occlusion determination(s). Additionally, the occluded patches can be otherwise filtered during subsequent method processes, and/or otherwise handled.

In a specific example, color image data and/or depth image data for the image frame can be used to select patches for subsequent processing (displacement estimation and/or conveyor motion estimation), prior to converting the patch to a flat, 2D grayscale image format (e.g., for processing in S130).

However, patches can be otherwise determined for the image frame(s).

In variants image frames sampled in S110 and/or image patches determining in S120 are preferably used for processing in a current (n) iteration/time-step of the method and stored for used in a subsequent (n+1) iteration or time-step, serving as a basis for comparison (e.g., phase correlation) to estimate a future displacement(s).

In variants, images collected by multiple, synchronized cameras and/or from multiple angles (e.g., in S110) can be evaluated within the same image/data frame. For example, separate patches can be determined for each image within the frame (e.g., for the respective cameras) and/or multiple images can be collectively processed (e.g., bundle adjustment for a single image frame; segmenting out arm occlusions using depth data, etc.).

Estimating a displacement for each patch S130 which functions to determine a displacement/shift of the patch (and/or pixels therein) relative to a prior image frame. The displacement is preferably estimated relative to a (consecutively) preceding image of the series sampled during S110. For example, the displacement of each patch of an image N can be estimated by comparing the image patch (e.g., grayscale image data bounded by rectangular pixel region [x1,y1] to [x2,y2] in frame N) to the corresponding pixel coordinates within the preceding (N−1) frame (e.g., grayscale image data bounded by rectangular pixel region [x1, y1] to [x2,y2] in frame N−1) of the series as a function of time. Additionally or alternatively, the displacement can be estimated relative to any suitable number or selection of preceding images/frames, and/or the displacement can be estimated for patches of any suitable image frame with any suitable periodicity/frequency (e.g., merging/combining a plurality of frame comparisons and displacement estimates into a single displacement estimate for a particular timestep, such as by a summation of displacements over a smaller timestep, weighted voting, estimating subpixel displacement, curve fitting, other aggregation techniques; to generate a sub-pixel displacement estimate, etc.).

In a first variant, the displacement is determined for each patch by a phase correlation of the patch relative to a prior image frame (e.g., a corresponding patch of the prior image frame, where patches are static relative to the frame coordinates; the image coordinate region within the prior image frame). As an example, the patch is received as a 2D grayscale image (or can be converted into a 2D grayscale image from an RGB image), which can be phase correlated with the corresponding pixel region (or corresponding patch; having the identical pixel coordinates) of a prior image frame to yield a pixel displacement for the entire patch. The displacement can be computed in 1D (e.g., aligned with direction of transformation; where displacement orthogonal to the axis of conveyor motion is neglected) or 2D (e.g., for both dimensions of the image), with integer/pixel precision (e.g., integer precision via a standard inverse Fourier transform of the normalized cross-spectrum; where displacement is a shift of N pixels, N being an integer value) or sub-pixel displacement precision (e.g., where beyond integer precision can be achieved via local function fitting, gradient correlation, optical flow techniques, etc.), and/or any other suitable displacement estimation techniques. For example, the displacement of a 2D grayscale image patch with coordinates [x1,y1] to [x2,y2] can be phase correlated relative to the corresponding image region [x1,y1] to [x2,y2] in the prior frame to yield a pixel shift as a vector [x,y], where the pixel shift in x can be the estimated (pixel) displacement along the conveyor.

In a second variant, displacement can optionally be estimated for each patch by tracking image features (e.g., edges, SIFT, HOG, ORB, etc.) and/or object detections across the patch(es) to estimate a net displacement of the patch across a prior frame(s). For example, the displacement of each patch can be determined by optical flow between consecutive frames. Alternatively, the displacement can be estimated without feature extraction and/or object detection within an image frame or a patch thereof (e.g., via pixel transforms). As an example, the conveyor belt may contain a relatively low density of identifiable image features and commonly identifiable features of the conveyor belt (e.g., texture, manufacturing process artifacts, etc.) may occur homogeneously, for which comparison techniques which incorporate more/all pixel data may yield comparatively greater efficacy/accuracy (when compared to feature-based tracking approaches).

Additionally or alternatively, displacement can be estimated for each patch using one or more optical flow techniques, which can include one or more of: phase correlation, block based methods, differential methods (e.g., based on partial derivatives of the image signal and/or the sought flow field and higher-order partial derivatives, such as Lucas-Kanade method, Lucas-Kanade method, Horn-Schunk method, Buxton-Buxton method, Black-Jepson method, general variation methods, etc.), Discrete optimization methods, and/or any other suitable optical flow techniques.

Additionally, S130 can optionally include determining a comparison parameter (e.g., phase correlation 'confidence'; confidence measure; comparison score; etc.) for the patch displacement, such as can be determined based on a statistical comparison/correlation of the patch between the current image frame (N) and the prior (N−1) image frame. For example, the comparison parameter can be a phase-correlation 'confidence score' for a patch in two (consecutive)

frames. Alternatively, any other suitable comparison parameter or confidence metric can be determined for each patch/displacement.

However, patch displacement can be otherwise estimated.

Estimating a conveyor motion parameter(s) based on the patch displacement S140 functions to generate an estimate of a set of conveyor motion parameters, such as speed and/or direction, based on the patch displacements from S130. The conveyor motion parameters can include: a conveyor direction (e.g., binary; relative to a primary axis; a unit vector, etc.); a conveyor speed (e.g., along a primary axis of the conveyor; etc.); a rate of speed change (a.k.a., an acceleration parameter); a conveyor status (e.g., moving; stationary; uniform speed; accelerating; decelerating); and/or any other suitable conveyor motion parameters. The conveyor motion parameters can include components in a single direction, such as a velocity component aligned with the long axis of the conveyor (e.g., direction of motion of the conveyor; frame X; along the long side(s) of the patches; etc.), and/or two directions (e.g., orthogonal X and Y velocity components), but can alternatively be directionless (e.g., where the net displacement may be assumed to occur along a precalibrated direction of motion of the conveyor), and/or can be otherwise suitably implemented.

In a specific example, the set of conveyor motion parameters can include a unified velocity estimate for the conveyor (i.e., speed and direction of conveyor motion).

In variants, the conveyor motion parameters can be estimated by leveraging one or more assumptions regarding the conveyor and/or conveyor region within the images, which can include: planarity (e.g., conveyor and all objects on the conveyor can be assumed to lie within a plane, such as a plane registered for the conveyor; which may be used for distance estimation from pixel space); uniform displacements (e.g., conveyor and all objects can be assumed to move together, within the conveyor region; which may neglect perturbations of individual objects along the conveyor and/or ingredient insertion along the conveyor); conveyor (and/or conveyor axis) aligned translation (e.g., motion limited to X; where all motion in Y may be ignored); and/or any other suitable simplifying assumptions.

The conveyor motion parameters can be estimated for an instantaneous frame (e.g., responsive to sampling the instantaneous frame and/or determining patches for the instantaneous frame), using only the most recent displacement estimations and/or the most recent N frames. Additionally or alternatively, the conveyor motion parameters can be estimated based on a rolling history of displacements and/or motion parameter estimates. For example, the conveyor speed can be estimated as a weighted (or unweighted) rolling average speed of over a recent time history (e.g., last N frames, last 3 frames, last 5 frames; within the last 0.5 seconds, 1 second, 3 seconds, etc.), based on the displacements and/or prior speed estimates. For example, speed estimates can be weighted based on proximity to a current time (e.g., where older estimates are gradually de-weighted) and/or a confidence metric (e.g., associated with number of dynamic patches within the frame; aggregate displacement confidence; statistical confidence in a conveyor displacement or conveyor speed estimate for the frame; etc.).

In variants, the conveyor motion parameters can be determined by a voting scheme based on the estimated displacement of the patches and a time interval associated with the displacement (e.g., time difference between the frames; period/interval between the current frame and the preceding frame; etc.; where the speed can be estimated by dividing the displacement between frames by the time interval between frames) according to any suitable set of rules/heuristics. As an example, the conveyor motion parameters can be determined by statistical and/or rule-based voting (e.g., heuristic voting scheme). For instance, all estimated displacements of dynamic patches (e.g., having a nonzero displacement along the axis of conveyor motion) can vote to generate an estimated direction of conveyor motion (e.g., binary determination; positive or negative along the axis) and/or an estimated conveyor speed.

Figure 3:
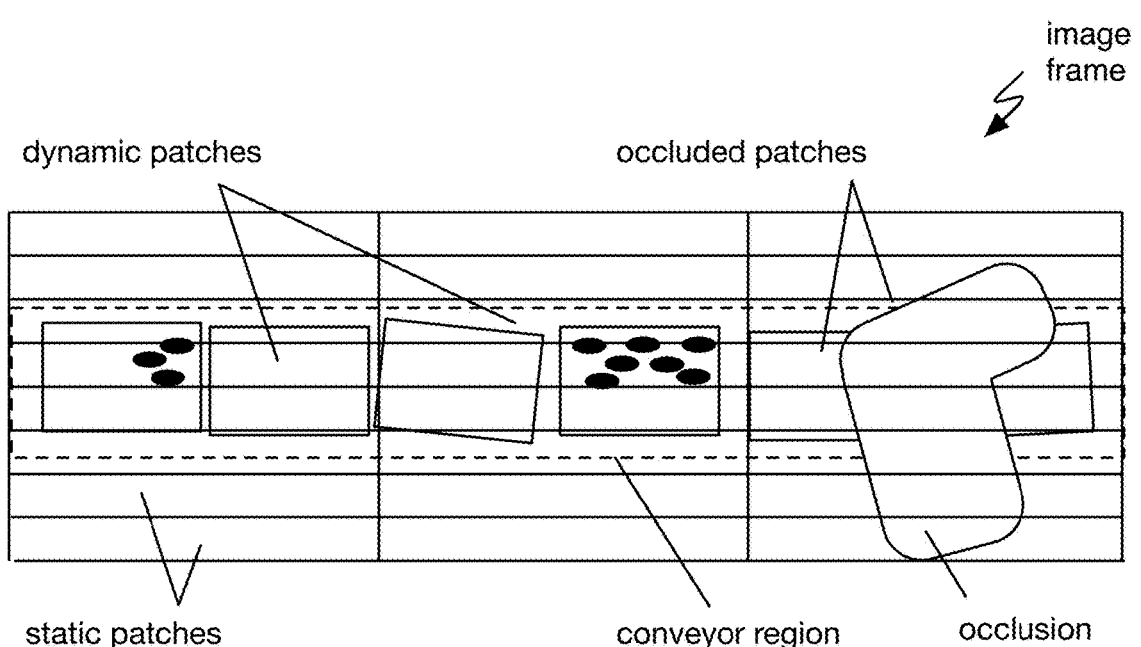
FIG. 3 is a diagrammatic representation of a variant of the method, illustrating patches determined for an example image frame.

In some variants, patches can optionally be classified based on the estimated displacement of the patch (e.g., an example is shown in FIG. 3), which can be used to filter-out or de-weight patches which are not associated with conveyor motion or which cannot be confidently used to estimate conveyor motion. For example, patches can be classified, based on the estimated displacement and/or displacement confidence, as: static (e.g., when the estimated displacement is zero, substantially zero along the axis of conveyor motion, less than a predetermined threshold, etc.), dynamic (e.g., when the estimated displacement is nonzero or above a predetermined threshold), occluded/low-confidence displacement (e.g., when the phase correlation confidence is below a confidence threshold; based on a prior occlusion determination in S120 and/or based on depth imaging data associated with the patch; etc.). Examples are shown in FIG. 3 and FIG. 4, with dynamic patches (satisfying a confidence threshold) illustrated in Green, low-confidence patches illustrated in Violet, and static patches illustrated in Blue. Patches can optionally be selectively included or excluded in a voting scheme or conveyor motion parameter estimation/determination based on the classification. For instance, the classification may facilitate estimation of the conveyor motion parameter based only on dynamic patches (e.g., Green patches in FIG. 4, FIG. 5, and FIG. 9). Alternatively, static patches and/or low-confidence displacements can be utilized in various edge/corner cases—such as in order to make a determination that the conveyor is stationary.

Additionally or alternatively, conveyor motion parameters can be estimated with one or more of: model-based techniques (e.g., neural networks, ML-models, regression models), classifiers, decision trees, heuristics, cost functions, voting schemes, classical algorithms, and/or any other suitable estimation/aggregation techniques or selection algorithms.

However, the conveyor motion parameters can be otherwise suitably estimated.

In an alternate set of variants, such as those operating in conjunction with a discretely-actuated, or 'piecewise', conveyor motion, S140 may additionally leverage assumptions regarding actuation motion, such as actuation period, piecewise actuation distance, and/or piecewise actuation speed, to estimate (piecewise) motion parameters based on the patch displacements. For example, S140 can optionally estimate (piecewise) motion parameters such as: remaining actuation distance, binary actuation state (e.g., stationary/moving), actuation trajectory, and/or any other suitable (piecewise) motion parameters based on piecewise motion characteristics/assumptions. The piecewise motion characteristics can be predetermined, inferred/derived from an object tracking history, dynamically estimated, received as a user input (e.g., configuration parameter, received via the HMI, etc.), and/or can be otherwise determined. However, piecewise motions can be otherwise handled, and/or piecewise motion parameters may be neglected entirely (e.g., in the case of a continuously actuated line).

Optionally performing an action based on the conveyor motion parameter S150 functions to enable planning and control of a robotic system based on the conveyor motion parameter(s). For example, S150 can facilitate container tracking, insertion target planning (e.g., insertion scheduling), trajectory estimation, and/or execution of robotic control (e.g., ingredient insertion) based on the conveyor motion parameters.

S150 can include providing the conveyor motion parameters to an object tracking system (e.g., to facilitate container tracking and/or state estimation of containers along the conveyor). The conveyor motion parameters (e.g., conveyor speed and direction) can be used by an object tracking system to estimate current states (e.g., pose, trajectory, etc.) of containers moving on the conveyor line, even when containers are occluded and/or fully unobservable by perception sensors. Additionally, container motion parameters can be used to generate trajectory predictions of containers as soon as they are detected (e.g., where no tracking history exists, the conveyor motion parameters can be used to infer past motion and predict future motion of the container; this may be particularly advantageous in cases where a container may be occluded as is it initially traverses through a large fraction, such as more than half, of the conveyor region).

S150 can include providing the conveyor motion parameters to a controller to facilitate insertion scheduling, insertion target selection, and/or insertion control, an example of which is shown in FIG. 6. In a first set of variants, conveyor motion parameters may be utilized to facilitate dynamic insertion scheduling based on the conveyor line speed, such as when only a subset of containers are selected for ingredient insertion. As an example, the conveyor motion parameters can be used by the insertion planning system and/or used in the insertion planning method as described in U.S. application Ser. No. 18/075,961, filed 6 Dec. 2022, titled "SYSTEM AND/OR METHOD OF COOPERATIVE DYNAMIC INSERTION SCHEDULING OF INDEPENDENT AGENTS," which is incorporated herein in its entirety by this reference. In a second set of variants, nonexclusive with the first set, the conveyor motion parameters can be used to facilitate dynamic control of a robotic insertion system. For example, the conveyor motion parameters can facilitate dynamically ceasing an insertion operation in response to a determination that the line has stopped and/or validating a direction of line operation concurrently with insertion (e.g., into an occluded/unobservable container).

S150 can additionally include: providing conveyor motion parameters to a user (e.g., via a human machine interface [HMI]), storing conveyor motion parameters (e.g., along with a labeled training dataset), providing conveyor motion parameters to a secondary computing module, transmitting conveyor motion parameters to a remote system, and/or otherwise performing any other suitable actions/operations based on the conveyor motion parameters. Additionally, in some variants, the conveyor motion parameters can be surfaced as HMI feedback and/or in conjunction with the HMI systems and/or method(s) (e.g., refill notifications, conveyor throughput parameter estimation, etc.) as described in U.S. application Ser. No. 18/124,451, filed 21 Mar. 2023, titled INTERFACE SYSTEM AND/OR METHOD FOR REFILLING ASSEMBLY SYSTEMS, which is incorporated herein in its entirety by this reference.

However, the conveyor motion parameters can additionally be used to initiate or facilitate any other suitable actions, and/or can be otherwise suitably used.

The method can be performed contemporaneously and/or concurrently with robot and/or conveyor operation (e.g., for a continuous translating line, for a stepwise/piecewise operating line, etc.), such as to facilitate insertion scheduling, insertion target selection, and/or insertion control (e.g., in accordance with S150). All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed.

All or portions of the method can be performed by one or more components of the system, using a computing system, using a database (e.g., a system database, a third-party database, etc.), by a user, and/or by any other suitable system(s). The computing system can include one or more: CPUs, GPUs, custom FPGA/ASICS, microprocessors, servers, cloud computing, and/or any other suitable components. The computing system can be local, remote, distributed, or otherwise arranged relative to any other system or module. For example, all or a portion of the method can be performed locally at a computing system of a robotic assembly system and/or a perception module thereof. However, the method can be otherwise performed.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method of image-based estimation of conveyor motion for a robot operating along a conveyor line, an intersection of a workspace of the robot and the conveyor line defining a conveyor region along the conveyor line, the method comprising:

at a first time, sampling a first image frame of a conveyor region with a set of cameras;

at a second time, sampling a second image frame with the set of cameras;

determining a plurality of image patches within the first image frame;

estimating a respective displacement for each image patch between the first and second image frames;

classifying a first subset of the plurality of image patches as dynamic image patches based on the respective displacement;

estimating a conveyor motion parameter for the conveyor line based on the respective displacement of each dynamic image patch of the first subset; and dynamically controlling the robot based on the conveyor motion parameter.

2. The method of claim 1, wherein the respective displacement for each image patch is estimated by phase correlation of the image patch between the first and second image frames.

3. The method of claim 1, wherein the conveyor motion parameter is estimated using a voting scheme based on the respective displacement of each dynamic image patch of the first subset.

4. The method of claim 3, further comprising: determining a confidence score for each image patch based on the respective displacement, wherein the voting scheme is weighted based on the confidence score.

5. The method of claim 4, wherein the respective displacement for each image patch is estimated by phase correlation of the image patch between the first and second image frames, wherein the confidence score for each image patch is determined based on the phase correlation.

6. The method of claim 1, further comprising: based on a registered conveyor pose, transforming each image frame using image homography to yield a uniform pixel-to-distance relationship.

7. The method of claim 1, wherein the patches are determined independently of the registered conveyor pose.

8. The method of claim 1, wherein the set of cameras comprises at least two cameras, arranged at opposite ends of the conveyor region along a direction of conveyor motion, which are configured to sample images synchronously.

9. The method of claim 1, wherein dynamically controlling the robot based on the conveyor motion parameter comprises: tracking an object within the conveyor region based on the conveyor motion parameter.

10. The method of claim 1, wherein the object is occluded by the robot in the second image frame.

11. The method of claim 1, wherein dynamically controlling the robot comprises: dynamically selecting a target within the conveyor region based on the conveyor motion parameter; and performing an operation with the robot based on the selected target.

12. The method of claim 1, wherein each image patch is rectangular, wherein a longer side of each image patch is substantially parallel with a direction of conveyor motion.

13. The method of claim 12, wherein the image patches are determined by subdividing the image frames in a rectilinear grid with at least 3 columns and at least 3 rows.

14. The method of claim 1, wherein the motion parameter comprises a conveyor speed along a direction of conveyor motion.

15. A method of image-based estimation of conveyor motion for a robot operating along a conveyor line, comprising:

periodically sampling image frames from a set of cameras above a conveyor line;

for each pair of consecutive image frames of the conveyor line:

determining a plurality of image patches;

for each image patch, estimating a displacement and a confidence score by phase correlation of the image patch between the consecutive image frames; and estimating a conveyor motion parameter based on the displacements and confidences scores of the image patches; and dynamically controlling the robot based on the conveyor motion parameter estimated for each pair of consecutive image frames.

16. The method of claim 15, wherein, for each pair of consecutive image frames, the conveyor motion parameter is estimated using a heuristic voting scheme based on the motion parameters and displacements.

17. The method of claim 15, further comprising: for at least one pair of consecutive image frames of the conveyor line:

filtering out a first subset of low-confidence image patches of the plurality of image patches based on the confidence score falling below a confidence threshold; and filtering out a second subset of static image patches of the plurality of image patches based on the displacement falling below a threshold displacement; and after filtering out the first and second subsets of image patches, estimating the conveyor motion parameter based on a remainder of the plurality of image patches.

18. The method of claim 15, further comprising:

registering a pose of a conveyor plane relative to the set of cameras based on depth-image data;

based on the registered pose of the conveyor plane relative to the set of cameras, transforming each image frame with image homography, wherein the image frames are 2D image frames, wherein the conveyor motion parameter is estimated based on a first assumption of uniform motion of the conveyor and a second assumption of conveyor planarity.

19. The method of claim 15, wherein the conveyor motion parameter comprises a conveyor speed estimated based on a period between image frames and a pixel-to-distance conversion based on the registered pose of the conveyor plane.

20. The method of claim 15, further comprising: tracking a set of objects on the conveyor line based on the conveyor motion parameter and images captured by the set of cameras with a first frame rate, wherein periodically sampling image frames comprises downsampling the images captured by the set of cameras with the first frame rate to within a range of 2 to 6 frames per second (FPS).

* * * * *